(12) United States Patent
Park et al.

(10) Patent No.: US 8,731,020 B2
(45) Date of Patent: May 20, 2014

(54) CONSTANT AMPLITUDE DECODING APPARATUS AND METHOD FOR MULTIPLEXED DIRECT-SEQUENCE SPREAD COMMUNICATION SYSTEM

(75) Inventors: Tae Joon Park, Daejeon (KR); Seong Soon Joo, Daejeon (KR); Jong Suk Chae, Daejeon (KR); Se Han Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 316 days.

(21) Appl. No.: 13/184,344

(22) Filed: Jul. 15, 2011

(65) Prior Publication Data

US 2012/0014411 A1 Jan. 19, 2012

(30) Foreign Application Priority Data

Jul. 16, 2010 (KR) .................... 10-2010-0068997
May 23, 2011 (KR) .................... 10-2010-0048468

(51) Int. Cl.
*H04B 1/00* (2006.01)
*H04L 5/12* (2006.01)

(52) U.S. Cl.
USPC .......................... 375/130; 375/262

(58) Field of Classification Search
USPC .......... 375/130, 260, 262, 340–341; 714/752, 714/755, 794–795
See application file for complete search history.

(56) References Cited

U.S. PATENT DOCUMENTS

| | | | | |
|---|---|---|---|---|
| 5,428,646 | A * | 6/1995 | Eyuboglu | 375/354 |
| 6,421,804 | B1 * | 7/2002 | Lee | 714/755 |
| 6,782,039 | B2 * | 8/2004 | Alamouti et al. | 375/147 |
| 7,177,658 | B2 * | 2/2007 | Willenegger et al. | 455/522 |
| 7,593,746 | B2 * | 9/2009 | Willenegger et al. | 455/522 |

FOREIGN PATENT DOCUMENTS

| | | |
|---|---|---|
| KR | 1020030081779 A | 10/2003 |
| KR | 1020050022450 A | 3/2005 |

* cited by examiner

*Primary Examiner* — Khanh C Tran

(57) ABSTRACT

A constant amplitude decoding apparatus and method for multiplexed direct-sequence spread spectrum communication system are provided. The constant amplitude decoding apparatus includes: a despreading and demultiplexing module receiving a data stream of a constant amplitude and despreading and demultiplexing the received data stream to restore it to a 2D signal; a decoding module first performing a vertical decoding on the 2D signal and then performing horizontal decoding thereon; a control module determining whether to repeatedly perform vertical decoding and horizontal decoding; and a bit stream information output module outputting the decoding results from the decoding module as a bit stream.

7 Claims, 4 Drawing Sheets

| | HADAMARD CODE | | | |
|---|---|---|---|---|
| ODD-NUMBER PARITY CHECK CODE | BIT 0 | BIT 1 | BIT 2 | |
| | BIT 3 | BIT 4 | BIT 5 | |
| | BIT 6 | BIT 7 | p | |
| | | | | |

CONSTANT AMPLITUDE DECODING APPARATUS AND METHOD FOR MULTIPLEXED DIRECT-SEQUENCE SPREAD COMMUNICATION SYSTEM

CROSS-REFERENCE TO RELATED APPLICATIONS

This application claims the priority of Korean Patent Application No. 10-2010-0068997 filed on Jul. 16, 2010 and Korean Patent Application No. 10-2011-0048468 filed on May 23, 2011, in the Korean Intellectual Property Office, the disclosure of which is incorporated herein by reference.

BACKGROUND OF THE INVENTION

1. Field of the Invention

The present invention relates to an apparatus and method for decoding a constant amplitude of a transmission signal in a multiplexed direct-sequence spread spectrum communication system and, more particularly, to a constant amplitude decoding apparatus and method in which a signal, which has been transmitted after its constant amplitude has been multiplexed, is received and converted into a square two-dimensional (2D) signal, and then, a process of performing odd-number parity check decoding with respect to a vertical axis and then even-number parity check decoding with respect to a horizontal axis is repeated in a constant amplitude multiplexed direct-sequence spread communication system using a frequency spread scheme in order to improve a data rate in a limited frequency band, thus simplifying an implementation algorithm so as to be appropriate for hardware implementation and exhibiting excellent performance in a Rayleigh fading environment.

2. Description of the Related Art

In a related art constant amplitude multiplexed direct-sequence spread communication system, added parity check information with respect to a horizontal direction and a vertical direction is used in order to decode a signal which has been transmitted after its constant amplitude has been encoded. In this case, however, a decoding algorithm is complicated and system performance is sharply degraded in a Rayleigh fading environment.

SUMMARY OF THE INVENTION

An aspect of the present invention provides a constant amplitude decoding apparatus and method in which, after a signal, which has been transmitted after its constant width has been multiplexed, is received and converted into a square 2D signal according to the characteristics of a constant amplitude multiplexed direct-sequence spread communication system, a process of performing odd-number parity check decoding with respect to a vertical axis and then performing even-number parity check decoding with respect to a horizontal axis is repeated, thus obtaining optimum performance with minimal repetition, simplifying an implementation algorithm appropriate for hardware implementation, and exhibiting excellent performance in a Rayleigh fading environment.

According to an aspect of the present invention, there is provided a constant amplitude decoding apparatus, including: a despreading and demultiplexing module receiving a data stream of a constant amplitude and despreading and demultiplexing the received data stream to restore it to a 2D signal; a decoding module first performing a vertical decoding on the 2D signal and then performing horizontal decoding thereon; a control module determining whether to repeatedly perform vertical decoding and horizontal decoding; and a bit stream information output module outputting the decoding results from the decoding module as a bit stream.

According to an aspect of the present invention, there is provided a constant amplitude decoding method including: a restoration step of despreading and demultiplexing a received data stream of a constant amplitude to restore it to a 2D signal; a decoding step of sequentially performing vertical decoding and horizontal decoding on the 2D signal; a controlling step of determining whether to reenter the decoding step in consideration of device complexity, low power requirements, and performance requirements; and an outputting step of outputting the decoding results in a bit stream if reentering the decoding step is not required.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
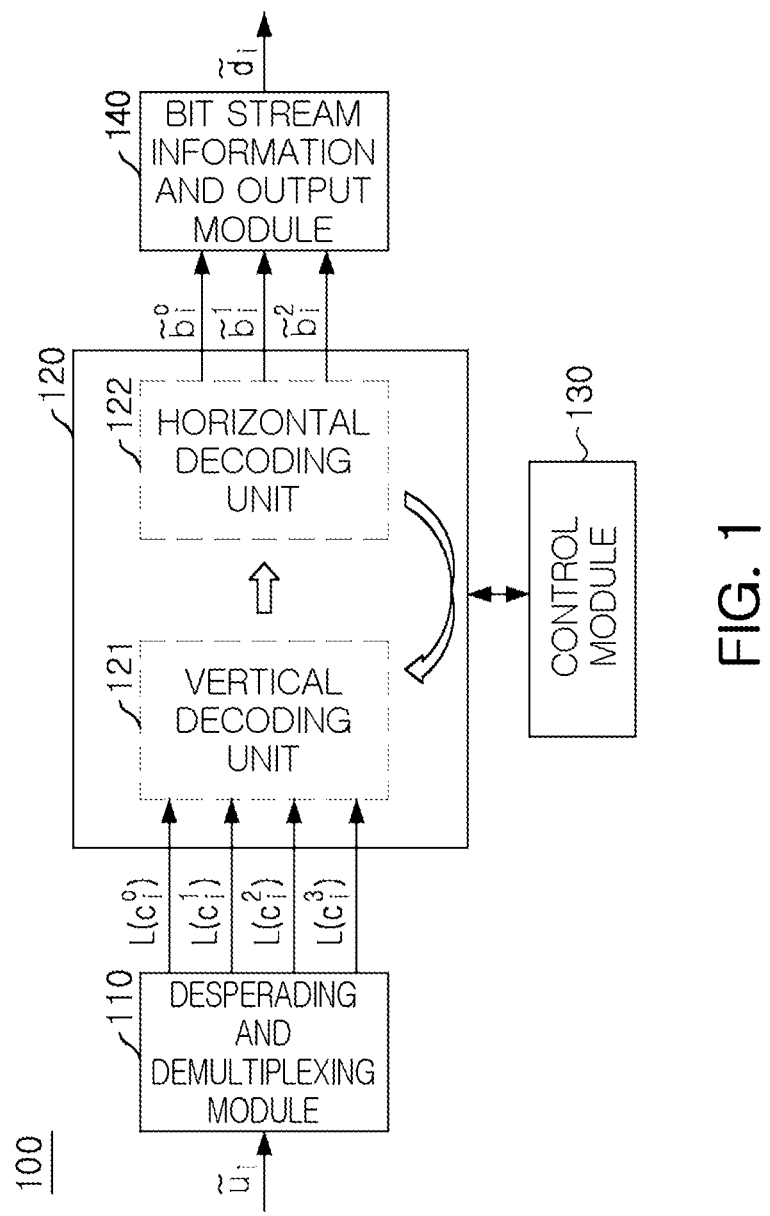
FIG. 1 is a schematic block diagram of a constant amplitude decoding apparatus according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The term 'module' refers to a unit performing a particular function or operation, and it may be implemented by hardware, software, or a combination thereof.

FIG. 1 is a schematic block diagram of a constant amplitude decoding apparatus according to an embodiment of the present invention.

With reference to FIG. 1, a constant amplitude decoding apparatus 100 includes a despreading and demultiplexing module 110 receiving a data stream of a constant amplitude and despreading and demultiplexing the received data stream to restore it to a 2D signal; a decoding module 120 performing vertical decoding on the 2D signal and then performing horizontal decoding on the resultant signal; a control module 130 determining whether to repeatedly perform the vertical decoding and horizontal decoding, and a bit stream information output module 140 outputting the decoding results from the decoding module (i.e., the decoding results obtained by the decoding module), in the form of a bit stream.

The despreading and demultiplexing module 110 despreads and demultiplexes a reception signal to restore the reception signal to a 2D signal, and then provides the 2D signal as an input to the decoding module 120 so as to be repeatedly vertically and horizontally decoded. For example, the despreading and demultiplexing module 110 may be easily implemented as an n×n fast Hadamard transform (FHT).

The decoding module, which includes a vertical decoding unit 121 and a horizontal decoding unit 122, first performs vertical decoding on the 2D signal, an output from the despreading and demultiplexing module 110, and then performs horizontal decoding thereon in consideration of the characteristics of restoring the constant amplitude-multiplexed signal into a 2D signal. Thus, the decoding module 120 according to an embodiment of the present invention has a simple implementation algorithm fitting a hardware implementation and guaranteeing excellent signal characteristics.

Preferably, the vertical decoding unit 121 and the horizontal decoding unit 122 perform vertical decoding and horizontal decoding on the 2D signal according to a turbo product code (TPC) decoding scheme, respectively.

Here, the TPC decoding is a 2D product code represented as [n,k]×[4,m], in which n is the number of bits to be decoded in the horizontal direction, k is the number of bits to be decided, and m is a value determining vertical decoding and may be determined according to a minimum Hamming distance and a spreading factor.

The control module 130 may determine whether to repeatedly perform vertical decoding and horizontal decoding according to device complexity, low power requirements, and performance requirements.

The bit stream information output module 140 outputs the decoding results from the decoding module 120, as a bit stream.

A [16,9] CDM employing [4,3]×[4,3] TPC will now be described in detail in a following embodiment.

A bit stream of 16 reception signals $\tilde{u}_i$ may be expressed as 4×4 matrix R as represented by Equation 1 shown below:

$$R = [\tilde{u}_i^0 \tilde{u}_i^1 \tilde{u}_i^2 \tilde{u}_i^3]$$ [Equation 1]

Here, $\tilde{u}_i$ may be represented by Equation 2 shown below, in which $\tilde{u}_i^j$ is a jth element of $\tilde{u}_i$.

$$\tilde{u}_i^l = \begin{bmatrix} \tilde{u}_i^{4l} \\ \tilde{u}_i^{4l+1} \\ \tilde{u}_i^{4l+2} \\ \tilde{u}_i^{4l+3} \end{bmatrix},$$ [Equation 2]

$l = 0, 1, 2, 3$

Meanwhile, in order to repeatedly perform decoding by the decoding module 120, a soft output with respect to each code symbol expressed by Equation 3 shown below is required.

$$L_c(c_i^{l,k}) = \log \frac{Pr(\tilde{u}_i^k | c_i^{l,k} = 0)}{Pr(\tilde{u}_i^k | c_i^{l,k} = 1)},$$ [Equation 3]

$l, k = 0, 1, 2, 3$

Figures 2, 3:
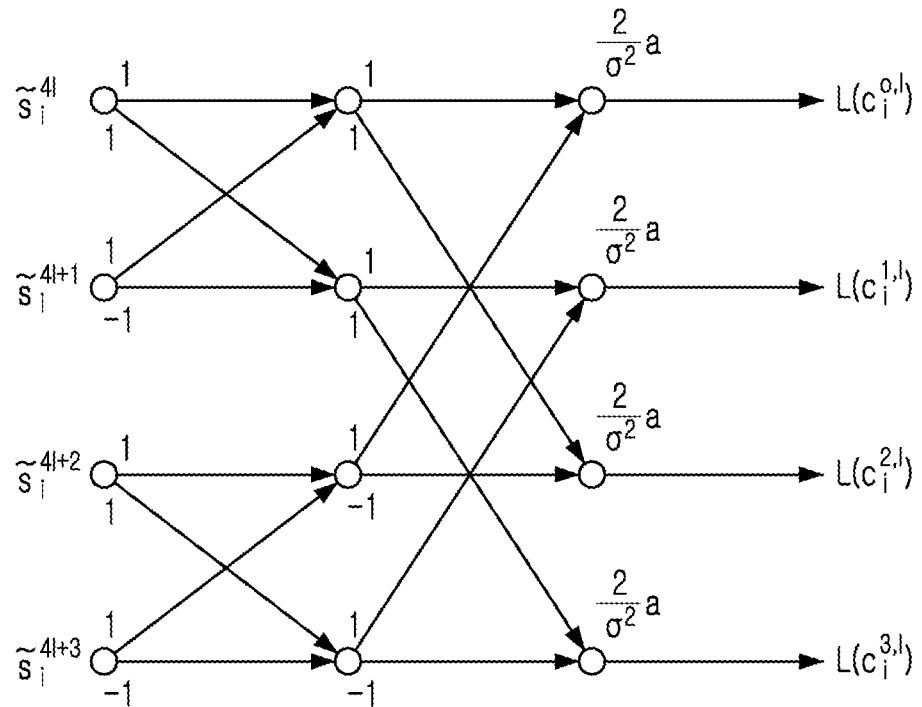
FIG. 2 is a view showing a 4×4 fast Hadamard transform (FHT)
FIG. 3 is a view showing a 2D data structure in which input information is converted into a codeword matrix by a decoding module illustrated in FIG. 1.

Such a soft output can be easily obtained by 4×4 FHT illustrated in FIG. 2. Here, $\sigma^2$ is a variance of an additive white Gaussian noise (AWGN) channel, and a is a fading amplitude.

A soft output matrix L of the results including the soft output of the code symbols can be represented by Equation 4 shown below, which is provided as an input to the decoding module 120.

$$L = \begin{bmatrix} L_c(c_i^{0,0}) & L_c(c_i^{0,1}) & \ldots & L_c(c_i^{0,3}) \\ L_c(c_i^{1,0}) & L_c(c_i^{1,1}) & \ldots & L_c(c_i^{1,3}) \\ \vdots & \vdots & \vdots & \vdots \\ L_c(c_i^{3,0}) & L_c(c_i^{3,1}) & \ldots & L_c(c_i^{3,3}) \end{bmatrix}$$ [Equation 4]

Thereafter, a log likelihood ratio (LLR) with respect to code symbols $c_i^{l,k}$, l, k=0, 1, 2, 3 in the nth repeated decoding by the decoding module 120 is obtained according to Equation 5 shown below:

$$L^n(c_i^{l,k}) = \log \frac{Pr(c_i^{l,k} = 0 | L)}{Pr(c_i^{l,k} = 1 | L)}$$ [Equation 5]

$$= L_c(c_i^{l,k}) + L_v^n(c_i^{l,k}) + L_h^n(c_i^{l,k})$$

Here, $L_v^n(c_i^{l,k})$ and $L_h^n(c_i^{l,k})$ are represented by Equation 6 and Equation 7 shown below:

$$L_v^n(c_i^{l,k}) = -2\tanh^{-1}\left\{\prod_{m \neq l} \tanh\left(\frac{L_c(c_i^{m,k}) + L_h^{n-1}(c_i^{m,k})}{2}\right)\right\}$$ [Equation 6]

$$L_h^n(c_i^{l,k}) = 2\tanh^{-1}\left\{\prod_{m \neq k} \tanh\left(\frac{L_c(c_i^{l,m}) + L_v^n(c_i^{l,m})}{2}\right)\right\}$$ [Equation 7]

Here, with respect to every l and k, $L_h^0(c_i^{l,k})$ is initialized to 0.

Also, Equation 6 and Equation 7 may be simplified into Equation 8 and Equation 9, respectively, in order to reduce decoding complexity.

$$L_v^n(c_i^{l,k}) = -\left[\prod_{m \neq l} \text{sgn}(L_c(c_i^{m,k}) + L_h^{n-1}(c_i^{m,k}))\right] \times$$ [Equation 8]

$$\min_{m \neq l}[L_c(c_i^{m,k}) + L_h^{n-1}(c_i^{m,k})]$$

$$L_h^n(c_i^{l,k}) =$$ [Equation 9]

$$-\left[\prod_{m \neq k} \text{sgn}(L_c(c_i^{l,m}) + L_v^{n-1}(c_i^{l,m}))\right] \times \min_{m \neq k}[L_c(c_i^{l,m}) + L_v^n(c_i^{l,m})]$$

Here, sgn(x)=x/|x|.

Finally, $\tilde{b}_i^{l,k}$, kth element of $\tilde{b}_i^l$ is expressed by Equation 10 shown below:

$$\tilde{b}_i^{l,k} = \text{sgn}(L^{nmax}(c_i^{l,k})), l,k=0,1,2$$ [Equation 10]

Here, $n_{max}$ is a maximum repetition decoding number.

FIG. 3 is a view showing a 2D data structure in which input information is converted into a codeword matrix by the decoding module illustrated in FIG. 1.

Figure 4:
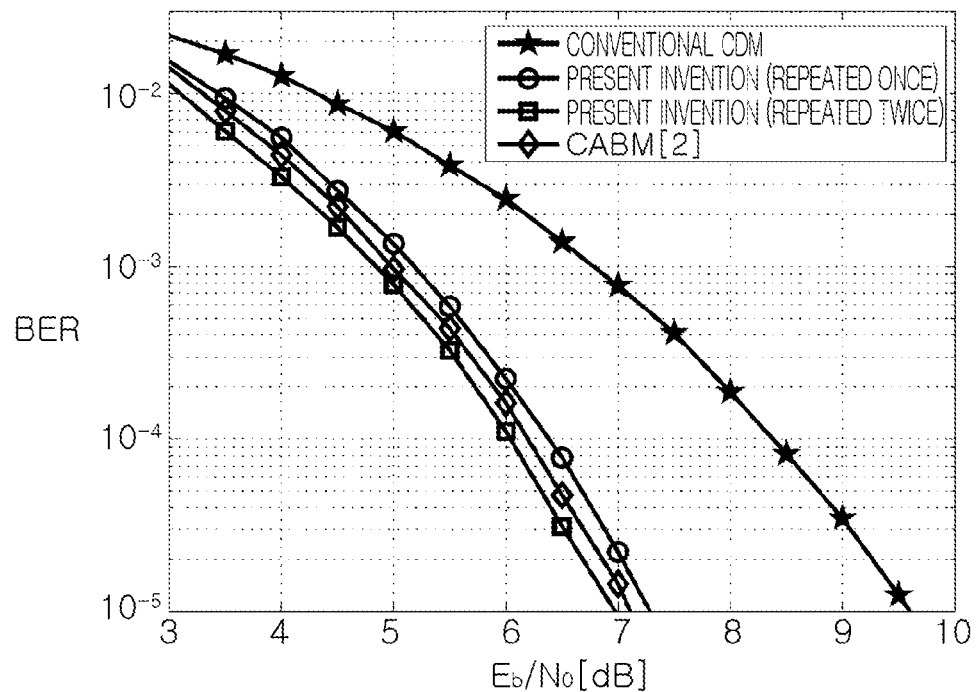
FIG. 4 is a graph of bit error rate (BER) performance over Eb/No in an additive white Gaussian noise (AWGN) situation.
Figure 5:
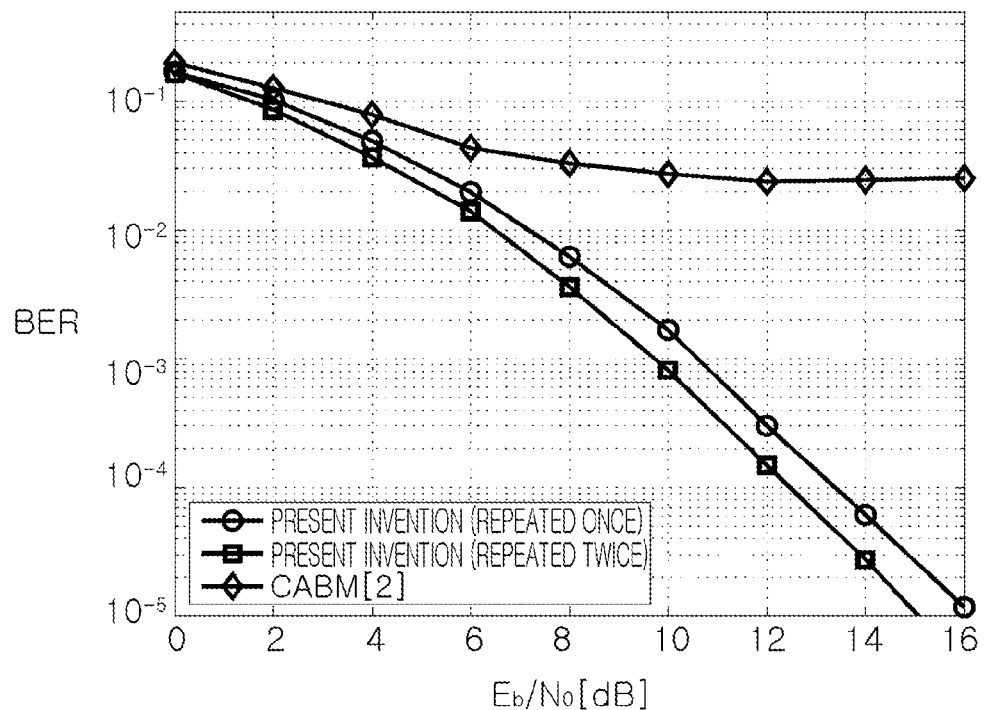
FIG. 5 is a graph of bit error rate (BER) performance over Eb/No in a Rayleigh fading channel environment.
Figure 6:
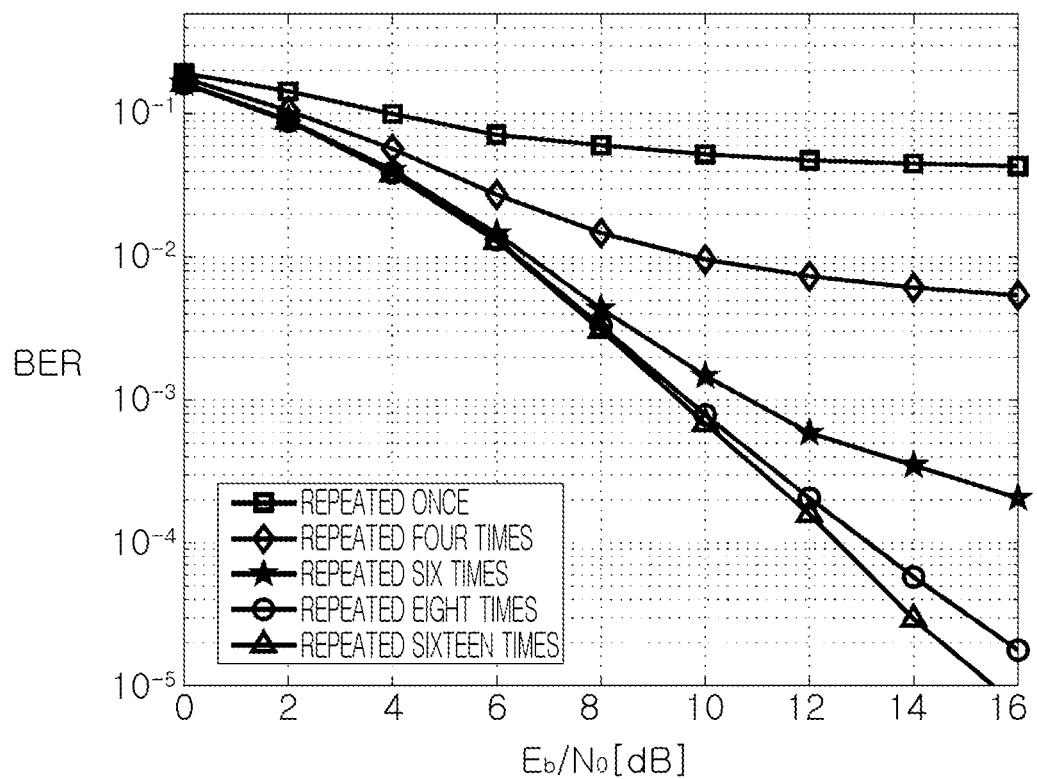
FIG. 6 is a graph of bit error rate (BER) performance over Eb/No when $n_{max}$ is changed in a Rayleigh fading channel environment in case in which horizontal decoding is first performed according to the related art.

FIG. 4 is a graph of bit error rate (BER) performance over Eb/No in an AWGN situation. FIG. 5 is a graph of bit error rate (BER) performance over Eb/No in a Rayleigh fading channel environment. FIG. 6 is a graph of bit error rate (BER) performance over Eb/No when $n_{max}$ is changed in a Rayleigh fading channel environment in a case in which horizontal decoding is first performed according to the related art.

With reference to FIGS. 5 and 6, in the case of the related art, when the maximum repetition decoding number $n_{max}$ is 1 and 2, the performance is degraded when compared with the embodiment of the present invention, and in order to obtain the same level of performance as that of the embodiment of the present invention, the maximum repetition decoding number $n_{max}$ must be 4 and 5.

As set forth above, according to exemplary embodiments of the invention, the implementation algorithm is so simple as to be appropriate for hardware implementation, and in order to guarantee excellent signal characteristics, vertical decoding is first performed and then horizontal decoding is performed in consideration of the characteristics of restoring the constant amplitude-multiplexed signal into a 2D signal, and whether to repeatedly perform decoding is determined in consideration of device complexity, low power consumption requirements, performance requirements, and the like. As a result, the constant amplitude decoding apparatus can accomplish superior performance in a Rayleigh fading environment.

While the present invention has been shown and described in connection with the exemplary embodiments, it will be apparent to those skilled in the art that modifications and variations can be made without departing from the spirit and scope of the invention as defined by the appended claims.

What is claimed is:

1. A constant amplitude decoding apparatus, comprising:
   a despreading and demultiplexing module configured to receive a data stream having a constant amplitude, and despread and demultiplex, using a micro-processor, the received data stream to restore a 2D signal;
   a decoding module configured to sequentially perform, using a micro-processor, a vertical decoding and a horizontal decoding on the 2D signal;
   a control module configured to determine, using a micro-processor, whether to repeatedly perform the vertical decoding and the horizontal decoding; and
   a bit stream information output module configured to output, using a micro-processor, decoded results from the decoding module as a bit stream.

2. The apparatus of claim 1, wherein the despreading and demultiplexing module is implemented using an n×n fast Hadamard transform (FHT).

3. The apparatus of claim 1, wherein the decoding module comprises:
   a vertical decoding unit configured to perform the vertical decoding on the 2D signal; and
   a horizontal decoding unit configured to perform the horizontal decoding on results of the vertical decoding.

4. The apparatus of claim 3, wherein the vertical decoding unit and the horizontal decoding unit are configured to perform the vertical decoding and the horizontal decoding according to a turbo product code (TPC) decoding scheme.

5. The apparatus of claim 3, wherein the control module is configured to determine whether to repeatedly perform the vertical decoding and the horizontal decoding according to device complexity, low power requirements, and performance requirements.

6. A constant amplitude decoding method comprising:
   despreading and demultiplexing a received data stream having a constant amplitude to restore a 2D signal;
   sequentially performing a vertical decoding and a horizontal decoding on the 2D signal;
   determining whether to repeat the vertical decoding and the horizontal decoding based on device complexity, low power requirements, and performance requirements; and
   outputting decoded results in a bit stream if it is determined not to repeat the vertical decoding and the horizontal decoding.

7. The method of claim 6, wherein the vertical decoding and the horizontal decoding are performed according to a turbo product code (TPC) decoding scheme.

* * * * *